(12) United States Patent
Buschmann

(10) Patent No.: US 10,583,723 B2
(45) Date of Patent: Mar. 10, 2020

(54) CONSTRUCTION MACHINE WITH OPERATING PLATFORM AND ACCESS CONTROL

(71) Applicant: JOSEPH VOEGELE AG, Ludwigshafen/Rhein (DE)

(72) Inventor: Martin Buschmann, Neustadt (DE)

(73) Assignee: JOESPH VOEGELE AG, Ludwigshafen/Rhein (DE)

( * ) Notice: Subject to any disclaimer, the term of this patent is extended or adjusted under 35 U.S.C. 154(b) by 0 days.

(21) Appl. No.: 16/003,481

(22) Filed: Jun. 8, 2018

(65) Prior Publication Data

US 2018/0354351 A1 Dec. 13, 2018

(30) Foreign Application Priority Data

Jun. 9, 2017 (EP) ..................................... 17175163

(51) Int. Cl.
| | | |
|---|---|---|
| *B60J 7/16* | (2006.01) | |
| *B60J 5/06* | (2006.01) | |
| *B60J 5/12* | (2006.01) | |
| *E01C 19/00* | (2006.01) | |
| *B60J 5/10* | (2006.01) | |
| *B60J 7/04* | (2006.01) | |

(Continued)

(52) U.S. Cl.
CPC ............... *B60J 7/165* (2013.01); *B60J 5/101* (2013.01); *B60J 5/125* (2013.01); *B60J 5/14* (2013.01); *B60J 7/042* (2013.01); *B60J 7/1635* (2013.01); *E01C 19/00* (2013.01); *E01C 19/48* (2013.01); *E01C 2301/30* (2013.01)

(58) Field of Classification Search
CPC ......... B60J 5/14; B60J 5/12; B60J 5/10; B60J 5/102; B60J 5/108; B60J 5/106; B60J 5/125; B60J 7/165
USPC .................................. 296/155, 26.05, 190.11
See application file for complete search history.

(56) References Cited

U.S. PATENT DOCUMENTS

| | | | | |
|---|---|---|---|---|
| 6,761,387 B2 * | 7/2004 | Sloss | ........................ | B60P 1/02 296/26.05 |
| 6,991,283 B2 * | 1/2006 | Akahane | ................. | B60R 21/13 296/155 |

(Continued)

FOREIGN PATENT DOCUMENTS

| | | |
|---|---|---|
| DE | 200 00 993 U1 | 3/2000 |
| FR | 2 779 404 A1 | 12/1999 |

(Continued)

OTHER PUBLICATIONS

Extended European Search Report dated Nov. 20, 2017, Application No. 17175163.9-1614, Applicant Joseph Voegele AG, 6 Pages.

(Continued)

*Primary Examiner* — Dennis H Pedder
(74) *Attorney, Agent, or Firm* — Brooks Kushman P.C.

(57) ABSTRACT

A construction machine is provided that has an operating platform, an access for entering the operating platform, a roof and an access control. The roof is disposed on a height-adjustable rack structure that can be actuated manually or by means of a drive in order to set the roof from an upper operating position to a lower transport position and vice versa. In this process, the access protection is moved from a storage position to a functional position in which the access to the operating platform is blocked by the access control.

20 Claims, 5 Drawing Sheets

(51) Int. Cl.
   *B60J 5/14*     (2006.01)
   *E01C 19/48*    (2006.01)

(56) References Cited

U.S. PATENT DOCUMENTS

| | | | | |
|---|---|---|---|---|
| 8,016,345 B1 * | 9/2011 | Goddard | ..................... | B60J 5/02 |
| | | | | 296/146.11 |
| 8,303,026 B2 * | 11/2012 | Yamashita | ......... | B62D 33/0617 |
| | | | | 296/146.16 |
| 2009/0192682 A1 * | 7/2009 | Ciarla | ........................ | B60J 5/02 |
| | | | | 701/49 |

FOREIGN PATENT DOCUMENTS

| JP | H0518928 U | 3/1993 |
| JP | H06156083 A | 6/1994 |
| JP | H08246507 A1 | 9/1996 |
| JP | 2004074958 A | 3/2004 |
| JP | 2009024414 A | 2/2009 |
| JP | 2010071072 A | 4/2010 |
| JP | 2011-183931 A | 9/2011 |
| JP | 2013174046 A | 9/2013 |

OTHER PUBLICATIONS

Japanese Office Action dated Jul. 2, 2019, Application No. 2018-099948, Reference No. 18N-P0318, Dispatch No. 272859, 4 Pages.

* cited by examiner

CONSTRUCTION MACHINE WITH OPERATING PLATFORM AND ACCESS CONTROL

CROSS-REFERENCE TO RELATED APPLICATIONS

This application claims foreign priority benefits under 35 U.S.C. § 119(a)-(d) to German patent application number EP 17175163.9, filed Jun. 9, 2017, which is incorporated by reference in its entirety.

TECHNICAL FIELD

The present disclosure relates to a construction machine, which can in particular be a road paver or a feeder vehicle, with an operating platform and a roof that extends over the operating platform.

BACKGROUND

Construction machines, in particular road construction machines, usually have an operating platform on which an operating panel for controlling the construction machine, at least one driver's seat and further operating devices are disposed and on which one or multiple operators and/or drivers can stay during operation. For better overview and coordination with other construction workers, the operating platform is often formed in an open way, i.e., not cabin-like, but has a roof for weather protection that extends over the operating platform. The roof is thereby installed on a rack structure that is formed of pipes, bars or similar components and braced. As the operating platform is mostly located in an elevated position on the construction machine, railings or lattices are usually installed as a safety barrier on the sides of the operating platform. Said railings or lattices limit at the same time the access to the operating platform, which is in most cases only enabled via a limited area on a side of the construction machine, mostly at the rear, through a gap in the railing. The rack structure that carries the roof often has an adjustable height so that the roof can be set from an upper operating position to a transport position, which is lowered to the operating platform, and vice versa. Therefore, the construction machine can be transported on a low-loader while limitations in height, for example while driving under bridges, can be respected. During non-operation and while the construction machine remains at the construction site, for example at night, it is in addition useful to protect at least the operating panel of the construction machine against unauthorized access and vandalism. This is mostly ensured through installation of lockable covers directly on the operating panel.

SUMMARY

The purpose of the disclosure is to provide improved protection for the operating panel of a construction machine.

A construction machine according to the disclosure, which can be a road paver or a feeder vehicle for a road paver, comprises an operating platform, which is covered by a roof that is carried by a height-adjustable rack structure. The rack structure can for example have four bars that are positioned at the corners of the operating platform, wherein the bars have a telescopic mechanism or hinges in order to adjust the roof from one or multiple upper operating positions to one or multiple lower transport positions and vice versa. In one of the upper operating positions, the roof is located at a height that enables access to the operating platform, and in one of the lower transport positions, the roof is lowered to the operating platform, i.e., for example to the operating panel and the driver's seat as points of the highest elevation. Expediently, mostly the top operating position and/or the lowest transport position is used; however, it can be helpful, for example while driving through low underpasses during road construction, to lower the roof slightly, for example by just a few centimeters, in order to avoid collisions.

An access control, which is formed as a planar element, is installed on the roof and/or the rack structure. The access control is configured to reversibly take on a storage position adjacent to the roof and a functional position at a farther distance from the roof. In the functional position, the access control blocks the access to the operating platform so that no individuals can access the operating platform any longer. As described above, the access is a gap in the delimitation of the operating platform in form of a railing, a lattice structure or a comparable enclosure. In this context, a railing can comprise two or multiple horizontal braces, which are arranged with a vertical spacing that prevents individuals from squeezing themselves through. Usually, the storage position of the access control is chosen during operation of the construction machine, and the functional position after the end of the operations or during an operating break. The access control expediently has a rectangular form without being limited to said form and can cover the access in the railing in an overlapping way, close the access in an exact way or also be smaller than the access as long as its size is sufficient to prevent individuals from accessing the operating platform. The operating platform is therefore protected against unauthorized access, which also prevents access to the operating panel and theft of the construction machine. Furthermore, all other devices located on the operating platform, for example the seats, are protected against vandalism by this arrangement. Hence, no separate covers are required for individual components such as the operating panel and consequently there is no need for storing multiple covers during operation. In particular for operating platforms, which have multiple operating panels, this translates into a reduced workload and time savings. As the operating platform is now locked completely, stowage areas remain in them, e.g., between the seats, which can be used to safely store materials such as tool boxes.

In a common embodiment of a construction machine, the roof has a planar form and the access control in the storage position is arranged essentially in parallel to the roof. A flat roof structure, which can be slightly inclined as a whole, provides an expedient weather protection. As the access control is essentially formed in a planar way as well, i.e., as its extensions in two coordinate axes are significantly larger than its extension in the third coordinate axis, it is particularly space-saving to provide the storage position at a surface of the roof. Therefore, the access control can be positioned for example on the bottom side of the roof and in parallel to said roof. There, it can be stored well and it is protected against weather conditions. Likewise, however, it would also be conceivable to store the access control on the top side of the roof. This would be particularly advantageous for the case in which additional switches, levers or similar devices for operating the construction machine are located on the bottom side of the roof.

In a common variant, the roof of the construction machine has a planar form and the access control in the functional position is disposed essentially perpendicularly to the roof. Therefore, the roof can be lowered to the operating platform after the end of the operations and the operating protection can be disposed in a way that the access to the operating platform is blocked, i.e., that the gap in an enclosure in form of a railing or lattice, which surrounds the operating platform, is closed. Depending on the inclination of the roof, which can also be useful in the lower transport position to enable for example a rainwater drainage or because the roof is lowered to different heights of the operating panel and the seats, the angle between the roof and the access control can also divert slightly (i.e., approximately by up to 10° or 15°) from 90°. This way, the access control can still be parallel to the rear wall and/or the rear railing of the operating platform and therefore ensure safe closing of the operating platform.

In an expedient embodiment, the access control in the storage position pursuant to the above explanations essentially has a horizontal form. This mostly corresponds essentially to the orientation of the roof of the operating platform and therefore allows for a space-saving storage of the access control.

In a further expedient embodiment, the access control is essentially arranged vertically in the functional position. This is, as already explained, mostly the arrangement that enables a flush closure with the rear wall of the construction machine as well as with the delimitation installed on the operating platform in form of a lattice, a railing or a similar device.

Typically, the access control is maintained removably from the roof in the storage position. Therefore, the access control can for example be disposed below the roof and fastened by means of rotatable or slidable locks. As an additional holder, protrusions or grooves can be used. Likewise, it is possible to maintain the access control in an insert that can also be locked on the open side. These variants are suitable to store the access control simply and promptly, and they also hold said access control reliably, also in case of occurring vibrations or shocks during operation of the construction machine. In addition, the access control can therefore be arranged without additional tools or loose fastening parts such as screwdrivers and screws.

In a particularly preferred variant, the access control is deflected around a hinge in order to be swiveled from the storage position into the functional position and vice versa. Expediently, the hinge is located on the rear edge of the access control. One or multiple rotatable or slidable locks can thereby be installed on the roof laterally or ahead of the access control and maintain the access control, as already mentioned, in an upward-folded storage position. Alternatively, the locks can also be installed on the access control and mesh with loops or grooves on the roof for locking. The hinge makes the change between the storage position and the functional position of the access control particularly easy so that said access control can simply be folded into the vertical position before the roof is lowered. In this context, the hinge can be manufactured in such a way that it limits the movement of the access control. Therefore, for example further deflection to the rear over a 90° position in relation to the roof can be limited by an end stop. Hence, the access to the operating platform in the functional position is therefore already protected against unwanted opening, i.e., further folding to the rear. Through overlap of the access control with the rear body part of the construction machine after lowering the roof, a new deflection to the front is prevented as well.

Preferably, the access control is braced on the roof and/or on the rack structure in such a way as to automatically perform a position change with respectively an upward or downward movement of the roof. This can be ensured by a rodding or another mechanism with sufficient mechanical stability. The mechanical translation can thereby be formed in a way that the access control is already folded downwards prior to achieving the transport position of the roof in order to overlap with the rear body wall of the construction machine with the subsequent remaining movement of the roof. If the roof is not moved, the rodding can keep the access control in its upper storage position so that no further locks are necessary for this purpose. Hence, the access control can swivel automatically up- and downwards with the up-and-down movement of the roof without any further manual intervention by the operator of the construction machine being required. This constitutes a particular time saving. At the same time, the automatic locking in the storage position provides additional safety for the persons on the construction machine as no undesired downfolding of the access control due to incorrect actuation of a lock can occur.

In a further variant, the construction machine has a hydraulic or electric drive for moving the roof and/or the access control. The hydraulic or electric drive can either drive only the roof and this movement is transmitted to the access control, as described in the previous section, with a bracing and/or a rodding, or both the roof as well as the access control are each equipped with a separate drive. In the latter case, both components can be controlled independently of one another. The electric drive can be implemented by respectively one or multiple electric motors and the hydraulic drive for example by means of a hydraulic cylinder. A hydraulic pump, in turn, can be operated by the primary drive of the construction machine, usually a diesel engine, or by means of electric motors. Both variants come with the advantage that the roof and the access control can be adjusted without any manual effort. Depending on the type and weight of the roof and the access control, either a hydraulic system, which enables particularly high adjustment forces, or an electric drive, which can be installed particularly easily and cost-efficiently, can be preferred.

Ideally, an operating element, which is suitable to control the drive for moving the roof and/or the access control, is arranged outside of the operating platform on the construction machine. The operating element is, typically in form of an electronic panel or console, connected to the electronic control of the construction machine and suitable to control the hydraulic and/or electric components for moving the roof and the access control. In this context, the operating element can be positioned at any advantageous place, i.e., at a place of the construction machine that is accessible and protected against contamination and mechanical impairment during operation, for example at a lateral position, at a rear position as for example at the staircase to the operating platform or, in case of a road paver, also on the paving screed. The power and control lines, which connect the operating element to the other components of the electronic control, are thereby guided wherever possible within metal pipes and rods or behind cladding parts in order to protect them from external influences and manipulation. The operating element can in addition be configured and interconnected to control the individual components by means of power line communication (PLC). By means of such an operating element, the roof and the access control can be adjusted because the lower transport position does not allow the operator to stay on the operating platform. In addition, the operating element can be configured to control further functions of the construction machine. For example and where applicable, also the diesel engine of the construction machine can be started by means of the operating element, for example to drive a hydraulic pump. The operating element can be configured in a way that required functions can be actuated away from the operating platform. The operating element can also be formed as a remote control that is removable from the construction machine. Together with a sender and a receiver unit on the construction machine, the operation can therefore also take place at a distance from the construction machine in a particularly convenient way. This can be helpful to get at the same time a better overview over the construction machine and the environmental conditions.

In a further possible variant, the construction machine has a mechanism to be actuated manually for moving the roof and/or the access control. For example, a crank mechanism is possible, which also allows for the adjustment of roofs with a higher weight by means of an appropriate mechanical translation. Such a mechanism to be actuated manually is a particularly simple and therefore cost-efficient implementation of a drive for adjusting the roof and the access control and can be used as a substitute in case of failure of the electric and hydraulic drive.

In a preferred variant, the access protection is formed as a closed area or as a lattice structure. For example, metal, steel, plastic or composite material can be used as a material. The length and width of the access protection expediently depend on the dimensions of the access to be closed and the thickness is chosen in a way as to ensure sufficient firmness as a function of the chosen material. In this context, the firmness should be sufficiently high in order to avoid the structure from being bent open by hand. Also, it should not be possible to bend it open by means of tools such as a chisel. As is generally known, components with a lattice-like structure can be extremely stable and lead at the same time to material savings. Therefore, such a structure can also be chosen for an access control. Reliable protection of the operating platform is consequently ensured.

Preferably, a locking mechanism, which is suitable to lock an actuation of the drive for moving the roof and/or of the access control, is arranged on the construction machine. The locking mechanism can for example be designed in form of a conventional ignition lock or as an electronic combination lock, i.e., as an electronic locking mechanism that is connected to the onboard electronics and operated via a keypad. The locking mechanism can be disposed in close proximity to the operating element described above or formed on or as a part of said operating element. In addition, the locking mechanism can be suitable to switch the construction machine as such on and off and/or to unblock and to lock its functions such as starting of the motor. A further locking mechanism with the same functions can exist on the operating platform itself. As generally known from comparable locking mechanisms in the automotive field such as ignition locks, commissioning and operation of the construction machine will therefore only be allowed to authorized persons.

Ideally, a locking device is disposed on the access control. For example, a hinge element or a lock on the access control can mesh in the known way with a loop at a body part and be secured by means of a padlock. Of course, also the reverse arrangement is possible. Also, a protection with a screw, which can only be opened with a suitably formed special tool, comparable to a rim lock, would be conceivable. Likewise, a locking device comparable to a door lock is possible. Such a locking device can be used in addition or alternatively to the abovementioned locking mechanism. Hence, protection of the operating platform by the access control is ensured in a way that is of particular mechanical stability.

In a further embodiment, the access control is formed in the way of a roller blind system. For example, the access control can be formed of segments and can be pulled out of its storage position on the roof of the construction machine in a downward direction and similarly to a roller blind into the functional position. A blind box, in which the access control is rolled up, can be installed on the roof. The roller blind can be formed as a metal grid or a composite structure of planar cut-to-length parts. As an alternative to a blind box, also a linear guiding can be installed on the bottom side of the roof that absorbs the access control. In this so-called sectional system, the individual sections of the access control are mostly larger than in a roller blind system with a box. In the lower functional position, a roller blind-like access control can be fastened over its entire width on the body of the construction machine in order to achieve a stable locking. In this context, the length and the structure of the access control in form of a roller blind are chosen in a way that said roller blind cannot be pushed away to the rear or to the front. In addition, lateral vertical guiding rails can also be provided, which mesh in the lower transport position of the roof with said roof and the body and therefore stabilize the roller blind laterally. A particular advantage of a roller blind system is the easy operability. The further development as a sectional system can in addition even mean an increased mechanical stability and makes a roller blind box, which might disturb under given circumstances, unnecessary.

In a further embodiment, the access control is formed as a swing system. A guiding mechanism and/or a guiding rail, which is formed on the roof, allows the access control to move from the storage position into the functional position in such a way that the end of the access control, which points to the rear in the storage position, constitutes the lower end in the functional position. In addition to the guiding rail, there can be a rodding for cushioning the movement, which, however, is not necessarily required. This variant combines the mechanical stability and hence the security of the above-described variant of an access control that can be deflected around a hinge with the advantage that the access control is not moved through the operating platform. This can be helpful under certain structural conditions.

Embodiments of the disclosure will be described in greater detail with reference to the attached drawings.

Identical components are marked respectively with identical reference signs in the Figures.

DETAILED DESCRIPTION

Figure 1:
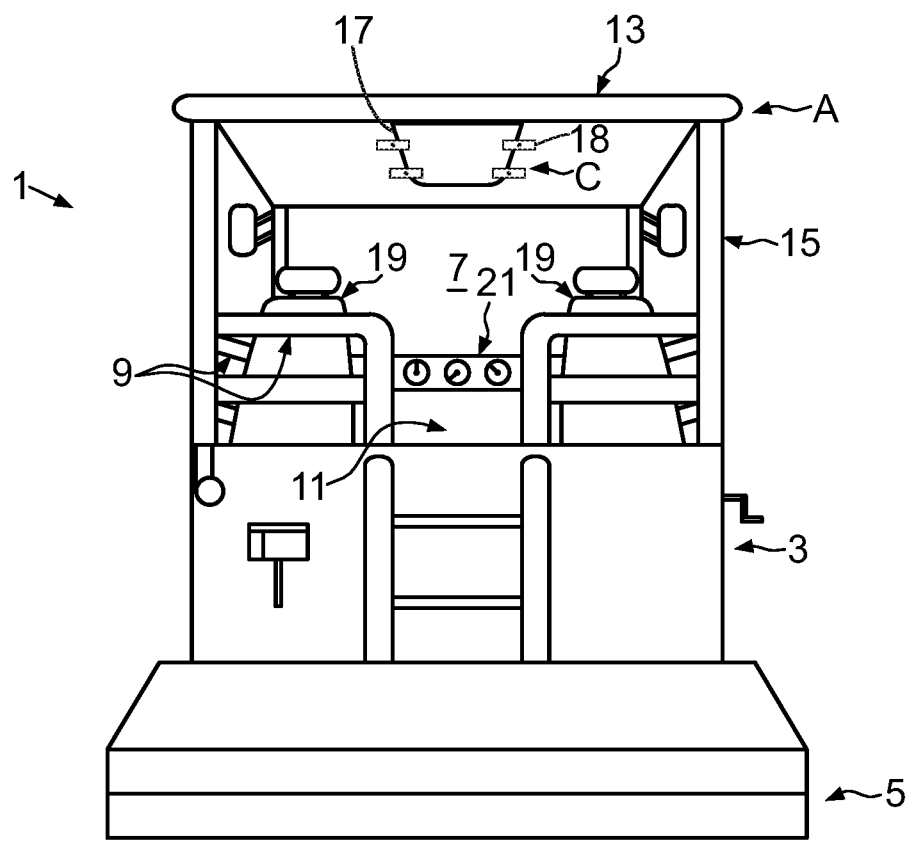
FIG. 1 is a perspective rear view of a construction machine in form of a road paver with a roof in an upper operating position and an access control that is disposed in a storage position.

FIG. 1 shows an embodiment of a construction machine 1 according to the disclosure, here exemplarily in form of a road paver in a perspective rear view. The road paver comprises a tractor 3 as well as a paving screed 5 that is optionally variable in size and/or replaceable. There is an operating platform 7, which is occupied by a driver during operation of the construction machine 1, on the tractor 3. The operating platform 7 is enclosed by lateral delimitations 9, here in form of railing-like braces, that leave room for an access 11 for entering the operating platform 7 at the rear of the construction machine 1.

The operating platform 7 is covered by a roof 13 that is carried by a height-adjustable rack structure 15. The rack structure 15 can comprise for example a telescopic mechanism that can be extended in an upward direction in order to set the roof 13 to an upper operating position A, or that can be pushed together in order lower the roof 13 into a lower transport position B (see FIGS. 3, 4) onto the operating platform 7. Depending on the structural requirements and desired properties, the roof 13 can respectively extend in an exact horizontal way or also be inclined in the upper and lower position A, B. On the roof 13, here exemplarily on its bottom side and in parallel to the roof 13, an access control is disposed in an essentially horizontal storage position C that is oriented in parallel to the roof 13. Furthermore, the access control 17 may be stored in the storage position C so that the access control 17 is removable from the roof 13. For example, the access control 17 can be disposed below the roof 13 and fastened by means of rotatable or slidable locks 18. Further elements such as one or multiple seats 19, an operating panel 21 or similar devices can be arranged on the operating platform 7.

Figure 2:
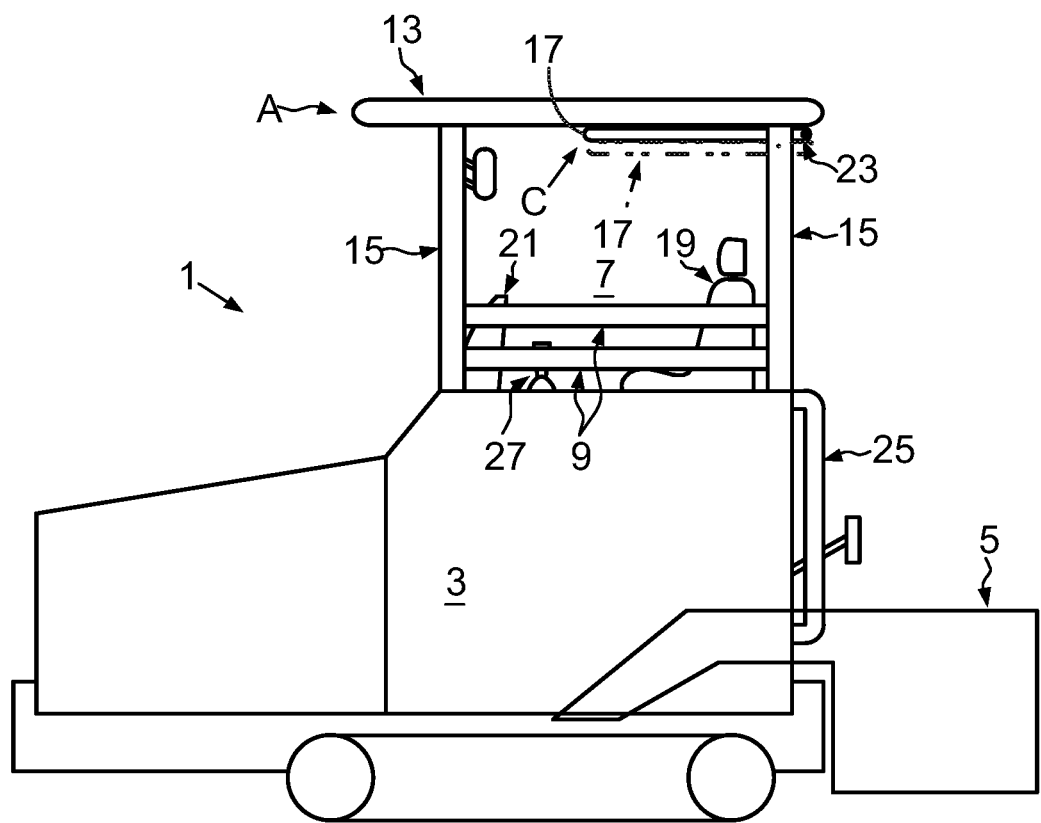
FIG. 2 is a side view of the construction machine in form of a road paver with a roof in an upper operating position and an access control that is disposed in a storage position.

FIG. 2 shows a side view of an embodiment of a construction machine 1 according to the disclosure in form of a road paver with a roof 13 in an upper operating position A and an access control 17 that is disposed in a storage position C. On the rear end, the access control 17 is hinged to the roof 13 by means of a hinge 23 in order to be swiveled from the storage position C into the functional position D (see FIGS. 3, 4) and vice versa. In another embodiment shown in phantom lines in FIG. 2, the access control 17 may be installed on the rack structure 15. The lateral delimitations 9 are arranged expediently in a way that they do not restrict the driver's view but still prevent access to the operating platform 7 while the roof is lowered 13. In addition, the delimitations 9 are at a useful height to prevent the driver from falling down from the operating platform 7. An additional railing 25 can be installed on the way up to the operating platform 7. A seat 19, the operating panel 21 and a control lever 27 are shown exemplarily on the operating platform 7.

Figure 3:
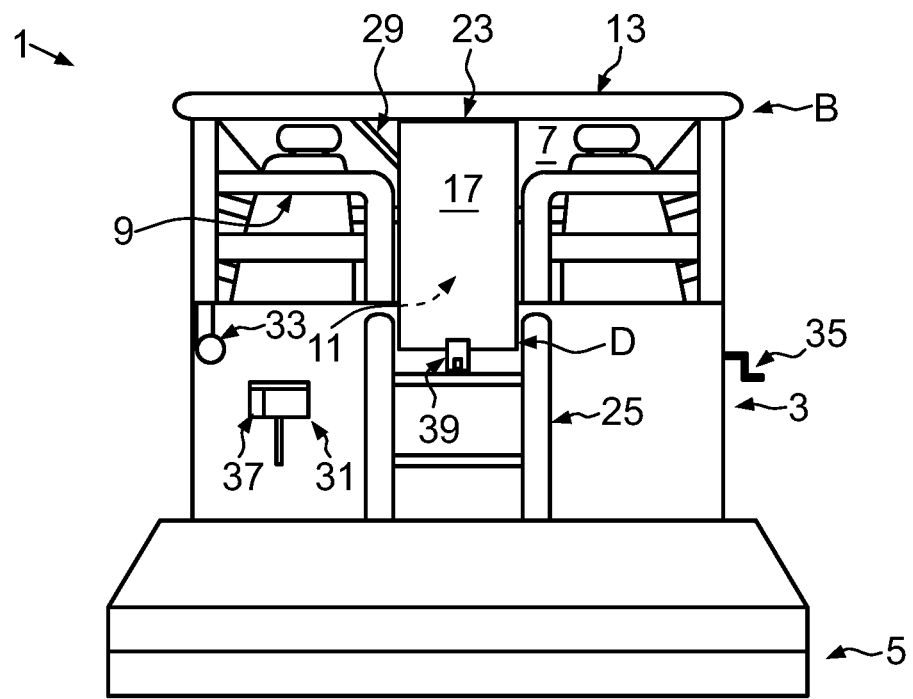
FIG. 3 is a perspective rear view of the construction machine in form of a road paver with a roof in a lower transport position and an access control that is disposed in a functional position.

FIG. 3 shows a perspective rear view of the construction machine 1 in form of a road paver with the roof 13 in a lower transport position B and an access control 17 that is disposed in a functional position D. As can be seen, the roof 13 is lowered to the operating platform 7 to an extent that no individuals can enter the operating platform 7 in connection with the delimitation 9. The only larger gap that has remained on the access 11 up to present is now closed by the access control 17 that is swiveled down in the essentially vertical functional position D. A bracing 29 is suitable to transmit the up-and-down movement of the roof 13 automatically to the access control 17.

An operating element 31 is used for steering the construction machine 1 from a position of the operator outside of the operating platform 7, in particular to actuate a drive 33 for moving the roof 13 as well as the access control 17. The operating element 31 may be formed as a remote control that is removable from the construction machine 1 (the operating element 31 is shown in phantom lines removed from the construction machine 1 in FIG. 4). As described above, the drive 33 can be hydraulic or electric and also comprise multiple drive components such as electric motors that are disposed on different positions, for example on the four lateral racks of the rack structure 15 and the access control 17. If there is only one drive 33, the force can be transmitted further, for example by means of the bracing 29. In contrast to the present illustration, the drive 33 can also be disposed in a way as to be covered under a body part. In addition, or as an alternative to the hydraulic or electric drive, there can be a mechanism 35 to be actuated manually. Said mechanism can for example be a crank mechanism and be used in case of a technical problem of the automated drive 33. A locking mechanism 37, for example a combination lock or an ignition lock, is used to prevent unauthorized actuation of the drive 33 and can be formed expediently on the operating element 31. A locking device 39 can be installed on the access control 17 and comprise for example a flap, which is articulated in a hinged way, a loop and a padlock.

Figure 4:
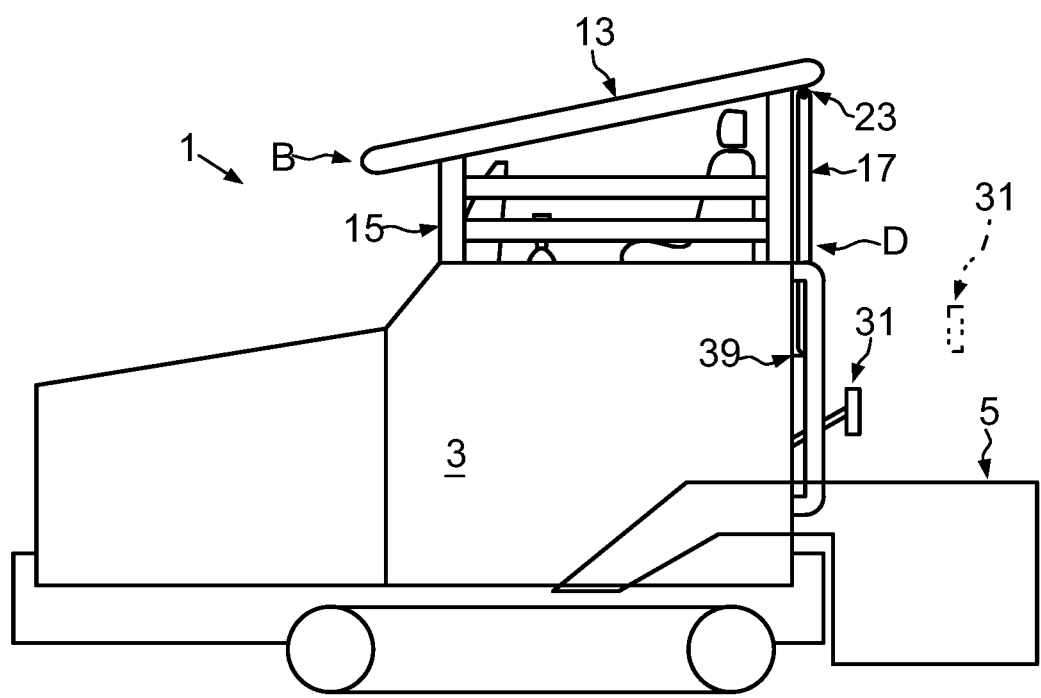
FIG. 4 is a side view of the construction machine in form of a road paver with a roof in a lower transport position and an access control that is disposed in a functional position.

FIG. 4 shows a side view of the construction machine 1 in form of a road paver with the roof 13 in a lower transport position B and an access control 17 that is disposed in a functional position D. The roof 13 is displayed with an inclination but can also take on the lower transport position B in an exactly horizontal orientation. It can be seen how the access control 17 overlaps on its lower end with the body of the construction machine 1 without any major distance. A locking device 39 can connect the access control 17 and the body with one another.

Figure 5:
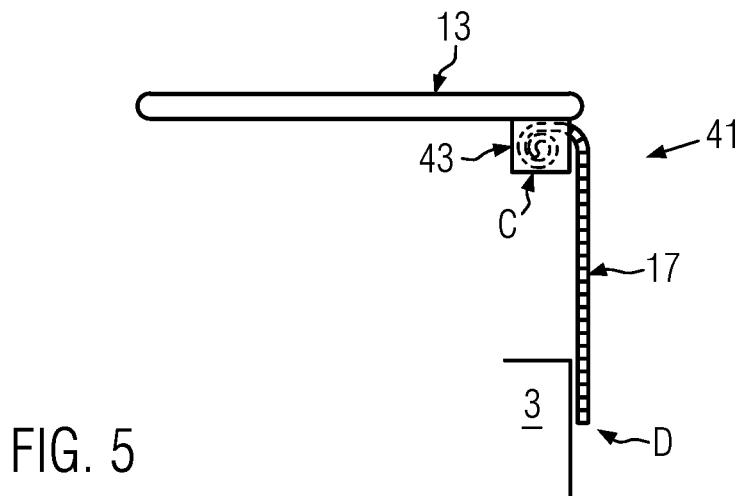
FIG. 5 is a side view of an alternative embodiment of an access control in form of a roller blind system.

FIG. 5 shows a side view of an alternative embodiment of an access control 17 in form of a roller blind system 41. A roller blind box 43, which completely absorbs the access control 17 in the storage position C, is installed on the roof 13. When the access control 17 in form of a roller blind is pulled out completely, it is in the functional position D and connected expediently with the body of the construction machine 1.

Figure 6:
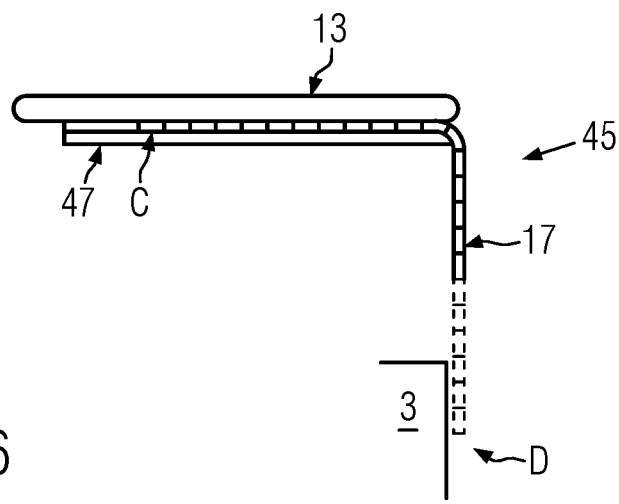
FIG. 6 is a side view of an alternative embodiment of an access control in form of a sectional system.

FIG. 6 shows a side view of an alternative embodiment of an access control 17 in form of a sectional system 45 as a further development of a roller blind system 41. In the upper storage position C, the access control 17 is positioned on the bottom side of the roof 13 by means of linear rails 47.

Figure 7:
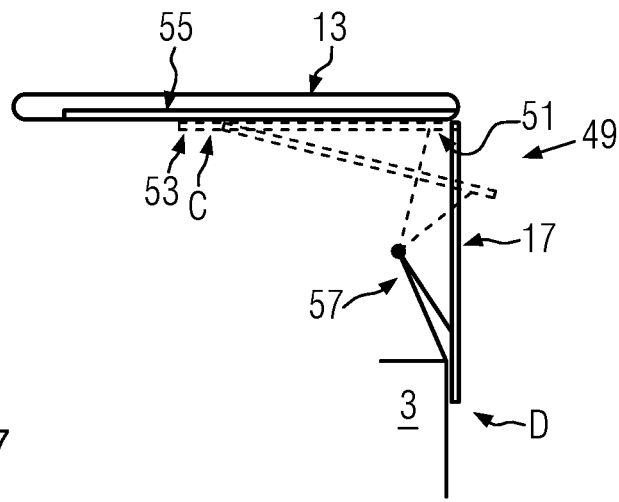
FIG. 7 is a side view of an alternative embodiment of an access control in form of a swing system.

FIG. 7 shows a side view of an alternative embodiment of an access control 17 in form of a swing system 49. In the storage position C, the inflexible access control 17 is parallel to the roof 13. From this position, the rear end 51 of the access control 17 is guided downwards, wherein the front end 53 is guided along to the rear through a guiding 55 in the roof 13 in which the access control 17 is embedded. In addition, a rack 57 can stabilize the movement Likewise, it would be possible to guide the access control 17 first completely to the rear in parallel to the roof 13, wherein it is for example installed in the guiding 55 on its front end 53 by means of rollers, and to subsequently swivel it downwards by 90° into the functional position D.

Figure 8:
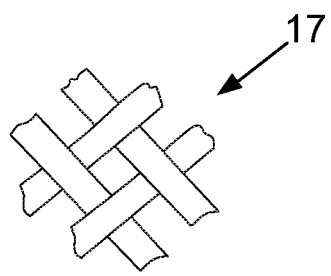
FIG. 8 is a fragmentary rear view of an embodiment of an access control having a lattice structure.

FIG. 8 shows a fragmentary rear view of another embodiment of an access control 17. In that embodiment, the access control 17 is formed as a lattice structure.

Based on the embodiments of a construction machine 1 with an access control 17 for an operating platform 7 shown above, numerous variations of said construction machine are possible. For example, also other storage positions are possible for the access control 17 on the construction machine 1 by means of a holder, for example on the side (right or left), at the rear on a body surface or on the railing behind the seats. In this context, attention should be paid that the operation of the construction machine 1 or the view of driver will not be impaired. The access control 17 itself could be formed of two or multiple parts with hinges that stably connect said parts so that the access control 17 can be folded before it is set to a storage position C.

What is claimed is:

1. A construction machine comprising:
   an operating platform that has lateral delimitations, an access for entering the operating platform, a roof and a height-adjustable rack structure that carries the roof, wherein the roof is adjustable from an upper operating position to a lower transport position and vice versa; and
   an access control installed on the roof and/or the rack structure, the access control being formed as a planar element and configured to reversibly take on a storage position, which is adjacent to the roof, and a functional position that is spaced farther away from the roof and in which the access to the operating platform is blocked by the access control, wherein the roof is adjustable to the lower transport position with the access control located at the functional position.

2. The construction machine according to claim 1 wherein the construction machine is a road paver or a feeder vehicle.

3. The construction machine according to claim 1 wherein the roof is formed in a planar way and the access control in the storage position is arranged essentially in parallel to the roof.

4. The construction machine according to claim 1 wherein the roof is formed in a planar way and the access control in the functional position is arranged essentially in a perpendicular direction to the roof.

5. The construction machine according to claim 1 wherein the access control in the storage position is essentially arranged in a horizontal way.

6. The construction machine according to claim 1 wherein the access control in the storage position is stored in a way as to be removable from the roof.

7. The construction machine according to claim 1 wherein the access control is articulatable around a hinge in order to be swiveled from the storage position into the functional position and vice versa.

8. The construction machine according to claim 7 wherein the access control is braced on the roof and/or the rack structure in such a way that it can automatically perform a position change with respectively one upward or downward movement of the roof.

9. The construction machine according to claim 1 further comprising a hydraulic or electric drive for moving the roof and/or the access control.

10. The construction machine according to claim 9 further comprising an operating element, which is suitable to control the drive for moving the roof and/or the access control, arranged outside of the operating platform on the construction machine.

11. The construction machine according to claim 10 wherein the operating element is formed as a remote control that can be detached from a portion of the construction machine.

12. The construction machine according to claim 1 further comprising a mechanism to be actuated manually for moving the roof and/or the access control.

13. The construction machine according to claim 1 wherein the access control is formed as a closed surface or a lattice structure.

14. The construction machine of claim 13 wherein the access control comprises metal, steel, plastic or composite material.

15. The construction machine according to claim 1 further comprising a hydraulic or electric drive for moving the roof and/or the access control, and a locking mechanism configured to lock an actuation of the drive.

16. The construction machine according to claim 1 further comprising a locking device disposed on the access control.

17. The construction machine according to claim 1 wherein the access control is formed as a roller blind system.

18. The construction machine according to claim 1 wherein the access control is formed as a swing system.

19. A construction machine comprising:
   an operating platform having lateral delimitations and an access for entering the operating platform;
   a roof that extends over the operating platform;
   a height-adjustable rack structure that carries the roof, the rack structure being configured to adjust the roof between an upper operating position and a lower transport position; and
   an access control installed on the roof and/or the rack structure, wherein the access control is formed as a planar element and is configured to reversibly take on a storage position in which the access control is positioned adjacent to the roof, and a functional position in which the access control is spaced farther away from the roof for blocking the access to the operating platform, wherein the roof is adjustable to the lower transport position with the access control located at the functional position, and wherein the roof is formed in a planar way and the access control in the functional position is arranged at an angle of 75° to 105° with respect to the roof.

20. A construction machine comprising:
   an operating platform that has lateral delimitations, an access for entering the operating platform, a roof and a height-adjustable rack structure that carries the roof, wherein the roof is adjustable from an upper operating position to a lower transport position and vice versa; and
   an access control installed on the roof and/or the rack structure, the access control being formed as a planar element and configured to reversibly take on a storage position, which is adjacent to the roof, and a functional position that is spaced farther away from the roof and in which the access to the operating platform is blocked by the access control, wherein the roof is adjustable to the lower transport position with the access control located at the functional position, and wherein the access control in the functional position is essentially arranged in a vertical way.

* * * * *